US012785730B1

(12) United States Patent
Peiffer

(10) Patent No.: US 12,785,730 B1
(45) Date of Patent: Nov. 3, 2026

(54) RADIO FREQUENCY UP/DOWN CONVERTER WITH REAL-TIME ADAPTATION

(71) Applicant: Rockwell Collins, Inc., Cedar Rapids, IA (US)

(72) Inventor: Benjamin Peiffer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 372 days.

(21) Appl. No.: 18/388,323

(22) Filed: Nov. 9, 2023

(51) Int. Cl.
*H04B 1/00* (2006.01)

(52) U.S. Cl.
CPC ......... *H04B 1/0096* (2013.01); *H04B 1/0057* (2013.01)

(58) Field of Classification Search
CPC ...... H04B 1/0096; H04B 1/0057; H04B 1/10; H04B 17/00
See application file for complete search history.

(56) References Cited

U.S. PATENT DOCUMENTS 5,886,752 A 3/1999 Cross
6,097,269 A * 8/2000 Hernandez ........... H03H 7/0115 455/340
6,115,363 A * 9/2000 Oberhammer ......... H03D 7/163 455/314
6,834,187 B1 * 12/2004 Weber .................. H04B 17/201 455/317
6,876,839 B2 4/2005 Harris
7,039,385 B1 5/2006 Hoffmann et al.
8,116,677 B2 2/2012 Rofougaran et al.
8,121,576 B2 2/2012 Choo et al.
8,149,896 B2 4/2012 Filipovic
8,185,078 B2 5/2012 Martens et al.
8,385,483 B2 2/2013 Abdelmonem et al.
8,422,971 B2 4/2013 Su et al.
8,666,349 B2 3/2014 Dickey et al.
8,718,584 B2 5/2014 Seendripu et al.
8,874,060 B2 10/2014 Wu et al.
8,938,203 B2 1/2015 Ancora et al.
9,059,768 B1 6/2015 Sorsby et al.
9,178,547 B1 11/2015 Sorsby
9,240,815 B1 1/2016 Wyse
10,389,395 B1 8/2019 Hovda et al.
10,516,426 B1 12/2019 Wyse
(Continued)

FOREIGN PATENT DOCUMENTS

EP 1233508 A2 * 8/2002 ............. H03D 7/161

OTHER PUBLICATIONS

Bert C. Henderson Mixers in Microwave Systems (Part 1); The Communications Edge, WJ Communications, Inc.; www.wj.com.

*Primary Examiner* — Charles N Appiah
*Assistant Examiner* — Sang Phuoc Le
(74) *Attorney, Agent, or Firm* — Suiter Swantz IP

(57) ABSTRACT

A radio frequency converter up converts intermediate frequencies to radio frequencies and down converts radio frequencies to intermediate frequencies. The radio frequency converter includes a synthesizer, a mixer, a tunable bandpass filter, and a radio frequency planner. The radio frequency planner adapts the synthesizer, mixer, and tunable bandpass filter based on inputs received by the radio frequency planner. The radio frequency planner performs the adaption in real-time.

17 Claims, 6 Drawing Sheets

(56) References Cited

U.S. PATENT DOCUMENTS

| | | | | |
|---|---|---|---|---|
| 10,666,370 | B2 | 5/2020 | Dufrene et al. | |
| 10,731,959 | B1 | 8/2020 | Lovseth et al. | |
| 10,784,908 | B2 | 9/2020 | Tracht | |
| 10,979,091 | B1 | 4/2021 | Wyse | |
| 11,025,287 | B1 | 6/2021 | Jensen | |
| 11,469,784 | B2 | 10/2022 | Vs et al. | |
| 11,621,737 | B2 | 4/2023 | Davies et al. | |
| 2008/0254759 | A1* | 10/2008 | Kintis | H04B 1/28 455/326 |
| 2008/0297171 | A1* | 12/2008 | Ruppel | H03F 3/24 324/607 |
| 2011/0151816 | A1* | 6/2011 | Wu | H04B 1/0007 455/260 |
| 2018/0316444 | A1* | 11/2018 | Dummermuth | G01R 21/01 |
| 2018/0331764 | A1* | 11/2018 | Flint | H04B 10/2575 |
| 2022/0103401 | A1* | 3/2022 | Sood | H04L 25/03006 |
| 2022/0190848 | A1 | 6/2022 | Jiang et al. | |
| 2023/0056713 | A1 | 2/2023 | Belkin | |

* cited by examiner

200

300

RADIO FREQUENCY UP/DOWN CONVERTER WITH REAL-TIME ADAPTATION

TECHNICAL FIELD

The present invention generally relates to radio systems, and more specifically to limiting or suppressing noise or interference in the radio systems.

BACKGROUND

One important consideration in the design of radio frequency (RF) systems is the design of radio frequency up/down converter (UDC) hardware with good suppression of spurious products. Frequency up/down converters are designed to ensure adequate suppression of the spurious products. Designers consider what RF frequencies will be covered by the converter to properly design a frequency plan. Spurious outputs are the result of images and nonlinearities in the frequency conversion process. Even when UDCs are well designed, UDCs generally do not have good spurious performance at all input/output combinations. Specific frequency plans, specifying the local oscillator (LO) and intermediate frequency (IF) associated with a particular RF frequency, are carefully generated to avoid spurs in all cases.

Narrow band up/down converters are designed for specific frequency ranges and bandwidths. The narrow band up/down converters are designed for the frequency ranges based on the design of the filters and mixers of the converters. The narrow band up/down converters are not adaptable to changes in the frequency ranges and bandwidths. Therefore, it would be advantageous to provide a device, system, and method that cures the shortcomings described above.

SUMMARY

An adaptive frequency converter is described. The adaptive frequency converter comprises a synthesizer. The synthesizer is configured to generate a local oscillator signal based on a local oscillator drive level and a local oscillator frequency. The adaptive frequency converter comprises a mixer. The mixer receives the local oscillator signal from the synthesizer. The mixer mixes an intermediate frequency signal with the local oscillator signal to generate a radio frequency signal. The adaptive frequency converter comprises a tunable bandpass filter comprising a filter center frequency and a filter bandwidth. The tunable bandpass filter is configured to tune the filter center frequency and the filter bandwidth based on a filter control signal. The tunable bandpass filter receives the radio frequency signal from the mixer and filters the radio frequency signal at the filter center frequency and the filter bandwidth. The adaptive frequency converter comprises a directional coupler. The adaptive frequency converter comprises a spur measurement circuit. The directional coupler is coupled between the tunable bandpass filter and the spur measurement circuit. The spur measurement circuit is configured to receive the radio frequency signal from the directional coupler. The spur measurement circuit is configured to generate an observation signal based on the radio frequency signal. The observation signal comprises a plurality of powers for a plurality of channels. The adaptive frequency converter comprises a radio frequency planner comprising one or more processors and a memory. The one or more processors are configured to execute program instructions maintained on the memory. The program instructions cause the radio frequency planner to receive at least a spur level, a local oscillator spur order, an intermediate frequency spur order, a target radio frequency, and a target bandwidth. The program instructions cause the radio frequency planner to set at least the local oscillator drive level, the local oscillator frequency, the filter control signal, and a target intermediate frequency based on at least the spur level, the local oscillator spur order, the intermediate frequency spur order, the target radio frequency, and the target bandwidth. The program instructions cause the radio frequency planner to iteratively adapt at least one of the local oscillator drive level, the local oscillator frequency, the filter control signal, or the target intermediate frequency based on the observation signal.

In some embodiments, the spur measurement circuit comprises a filter bank. The filter bank is coupled to the directional coupler. The filter bank filters the radio frequency signal into the plurality of channels. The spur measurement circuit comprises a filter bank a radio frequency detector bank. The radio frequency detector bank is coupled to the filter bank. The radio frequency detector bank determines the plurality of powers for each of the plurality of channels. The spur measurement circuit comprises an analog-to-digital converter bank. The analog-to-digital converter bank is coupled to the radio frequency detector bank. The analog-to-digital converter bank converts the plurality of powers to the observation signal.

In some embodiments, the program instructions maintained on the memory causing the radio frequency planner to receive a spur table. The program instructions maintained on the memory causing the radio frequency planner set at least the local oscillator drive level, the local oscillator frequency, the filter control signal, and a target intermediate frequency based on the spur table.

In some embodiments, the program instructions maintained on the memory causing the radio frequency planner to: receive a spur model; and calculate, using the spur model, combinations of the intermediate frequency signal, the local oscillator signal, the local oscillator drive level, and the filter control signal that result in the target radio frequency, the target bandwidth, and the spur level out to the local oscillator spur order and the intermediate frequency spur order.

In some embodiments, the program instructions maintained on the memory causing the radio frequency planner to receive a filter transition bandwidth. The program instructions maintained on the memory causing the radio frequency planner to set at least the local oscillator drive level, the local oscillator frequency, the filter control signal, and a target intermediate frequency based on the filter transition bandwidth.

In some embodiments, iteratively adapting at least one of the local oscillator drive level, the local oscillator frequency, the filter control signal, or the target intermediate frequency reduces a spurious product in the radio frequency signal introduced by the mixer.

In some embodiments, the program instructions maintained on the memory causing the radio frequency planner to store the local oscillator drive level, the local oscillator frequency, the filter control signal, the target intermediate frequency, and the observation signal in memory. The program instructions maintained on the memory causing the radio frequency planner to perform reinforcement learning on the local oscillator drive level, the local oscillator frequency, the filter control signal, the target intermediate frequency, and the observation signal stored in memory to iteratively adapt the local oscillator drive level, the local oscillator frequency, the filter control signal, and the target intermediate frequency.

In some embodiments, the adaptive frequency converter comprises a second directional coupler. The second directional coupler is coupled between the mixer and the spur measurement circuit. The spur measurement circuit is configured to receive the intermediate frequency signal from the second directional coupler. The spur measurement circuit is configured to generate the observation signal based on the radio frequency signal during up-convert and based on the intermediate frequency signal during down-convert. The mixer mixes the radio frequency signal with the local oscillator signal to generate the intermediate frequency signal during down-convert and mixes the intermediate frequency signal with the local oscillator signal to generate the radio frequency signal during up-convert.

In some embodiments, the adaptive frequency converter comprises a switch. The switch is coupled between the spur measurement circuit, the directional coupler, and the second directional coupler.

A radio system is described. The radio system comprises an adaptive frequency converter. The adaptive frequency converter comprises a synthesizer. The synthesizer is configured to generate a local oscillator signal based on a local oscillator drive level and a local oscillator frequency. The adaptive frequency converter comprises a mixer. The mixer receives the local oscillator signal from the synthesizer. The mixer mixes an intermediate frequency signal with the local oscillator signal to generate a radio frequency signal. The adaptive frequency converter comprises a tunable bandpass filter comprising a filter center frequency and a filter bandwidth. The tunable bandpass filter is configured to tune the filter center frequency and the filter bandwidth based on a filter control signal. The tunable bandpass filter receives the radio frequency signal from the mixer and filters the radio frequency signal at the filter center frequency and the filter bandwidth. The adaptive frequency converter comprises a directional coupler. The adaptive frequency converter comprises a spur measurement circuit. The directional coupler is coupled between the tunable bandpass filter and the spur measurement circuit. The spur measurement circuit is configured to receive the radio frequency signal from the directional coupler. The spur measurement circuit is configured to generate an observation signal based on the radio frequency signal. The observation signal comprises a plurality of powers for a plurality of channels. The adaptive frequency converter comprises a radio frequency planner comprising one or more processors and a memory. The one or more processors are configured to execute program instructions maintained on the memory causing the radio frequency planner to receive at least a spur level, a local oscillator spur order, an intermediate frequency spur order, a target radio frequency, and a target bandwidth. The program instructions maintained on the memory causing the radio frequency planner set at least the local oscillator drive level, the local oscillator frequency, the filter control signal, and a target intermediate frequency based on at least the spur level, the local oscillator spur order, the intermediate frequency spur order, the target radio frequency, and the target bandwidth. The program instructions maintained on the memory causing the radio frequency planner iteratively adapt at least one of the local oscillator drive level, the local oscillator frequency, the filter control signal, or the target intermediate frequency based on the observation signal. The radio system comprises a software-defined radio coupled to the adaptive frequency converter; wherein the software-defined radio is configured to receive the target intermediate frequency from the radio frequency planner and generates the intermediate frequency signal at the target intermediate frequency.

In some embodiments, the radio frequency planner receives at least the spur level, the local oscillator spur order, the intermediate frequency spur order, the target radio frequency, and the target bandwidth from the software-defined radio.

In some embodiments, the radio system comprises an antenna coupled to the adaptive frequency converter.

An adaptive frequency converter is described. The adaptive frequency converter comprises a synthesizer. The synthesizer is configured to generate a local oscillator signal based on a local oscillator drive level and a local oscillator frequency. The adaptive frequency converter comprises a tunable bandpass filter comprising a filter center frequency and a filter bandwidth. The tunable bandpass filter is configured to tune the filter center frequency and the filter bandwidth based on a filter control signal. The tunable bandpass filter filters a radio frequency signal at the filter center frequency and the filter bandwidth. The adaptive frequency converter comprises a mixer. The mixer receives the local oscillator signal from the synthesizer and the radio frequency signal from the tunable bandpass filter. The mixer mixes a radio frequency signal with the local oscillator signal to generate an intermediate frequency signal. The adaptive frequency converter comprises a directional coupler. The adaptive frequency converter comprises a spur measurement circuit. The directional coupler is coupled between the mixer and the spur measurement circuit. The spur measurement circuit is configured to receive the intermediate frequency signal from the directional coupler. The spur measurement circuit is configured to generate an observation signal based on the intermediate frequency signal. The observation signal comprises a plurality of powers for a plurality of channels. The adaptive frequency converter comprises a radio frequency planner comprising one or more processors and a memory. The one or more processors are configured to execute program instructions maintained on the memory causing the radio frequency planner to receive at least a spur level, a local oscillator spur order, an intermediate frequency spur order, a target radio frequency, and a target bandwidth. The one or more processors are configured to execute program instructions maintained on the memory causing the radio frequency planner to set at least the local oscillator drive level, the local oscillator frequency, the filter control signal, and a target intermediate frequency based on at least the spur level, the local oscillator spur order, the intermediate frequency spur order, the target radio frequency, and the target bandwidth. The one or more processors are configured to execute program instructions maintained on the memory causing the radio frequency planner to iteratively adapt at least one of the local oscillator drive level, the local oscillator frequency, the filter control signal, or the target intermediate frequency based on the observation signal.

In some embodiments, the spur measurement circuit comprises a filter bank. The filter bank is coupled to the directional coupler. The filter bank filters the intermediate frequency signal into the plurality of channels. The spur measurement circuit a radio frequency detector bank. The radio frequency detector bank is coupled to the filter bank. The radio frequency detector bank determines the plurality of powers for each of the plurality of channels. The spur measurement circuit an analog-to-digital converter bank. The analog-to-digital converter bank is coupled to the radio frequency detector bank; wherein the analog-to-digital converter bank converts the plurality of powers to the observation signal.

In some embodiments, the program instructions maintained on the memory causing the radio frequency planner to receive a spur table. The program instructions maintained on the memory causing the radio frequency planner to set at least the local oscillator drive level, the local oscillator frequency, the filter control signal, and a target intermediate frequency based on the spur table.

In some embodiments, the program instructions maintained on the memory causing the radio frequency planner to receive a spur model. The program instructions maintained on the memory causing the radio frequency planner to calculate, using the spur model, combinations of the intermediate frequency signal, the local oscillator signal, the local oscillator drive level, and the filter control signal that result in the target radio frequency, the target bandwidth, and the spur level out to the local oscillator spur order and the intermediate frequency spur order.

In some embodiments, the program instructions maintained on the memory causing the radio frequency planner to receive a filter transition bandwidth. The program instructions maintained on the memory causing the radio frequency planner to set at least the local oscillator drive level, the local oscillator frequency, the filter control signal, and a target intermediate frequency based on the filter transition bandwidth.

In some embodiments, iteratively adapting at least one of the local oscillator drive level, the local oscillator frequency, the filter control signal, or the target intermediate frequency reduces a spurious product in the intermediate frequency signal introduced by the mixer.

In some embodiments, the program instructions maintained on the memory causing the radio frequency planner to store the local oscillator drive level, the local oscillator frequency, the filter control signal, the target intermediate frequency, and the observation signal in memory. The program instructions maintained on the memory causing the radio frequency planner to perform reinforcement learning on the local oscillator drive level, the local oscillator frequency, the filter control signal, the target intermediate frequency, and the observation signal stored in memory to iteratively adapt the local oscillator drive level, the local oscillator frequency, the filter control signal, and the target intermediate frequency.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
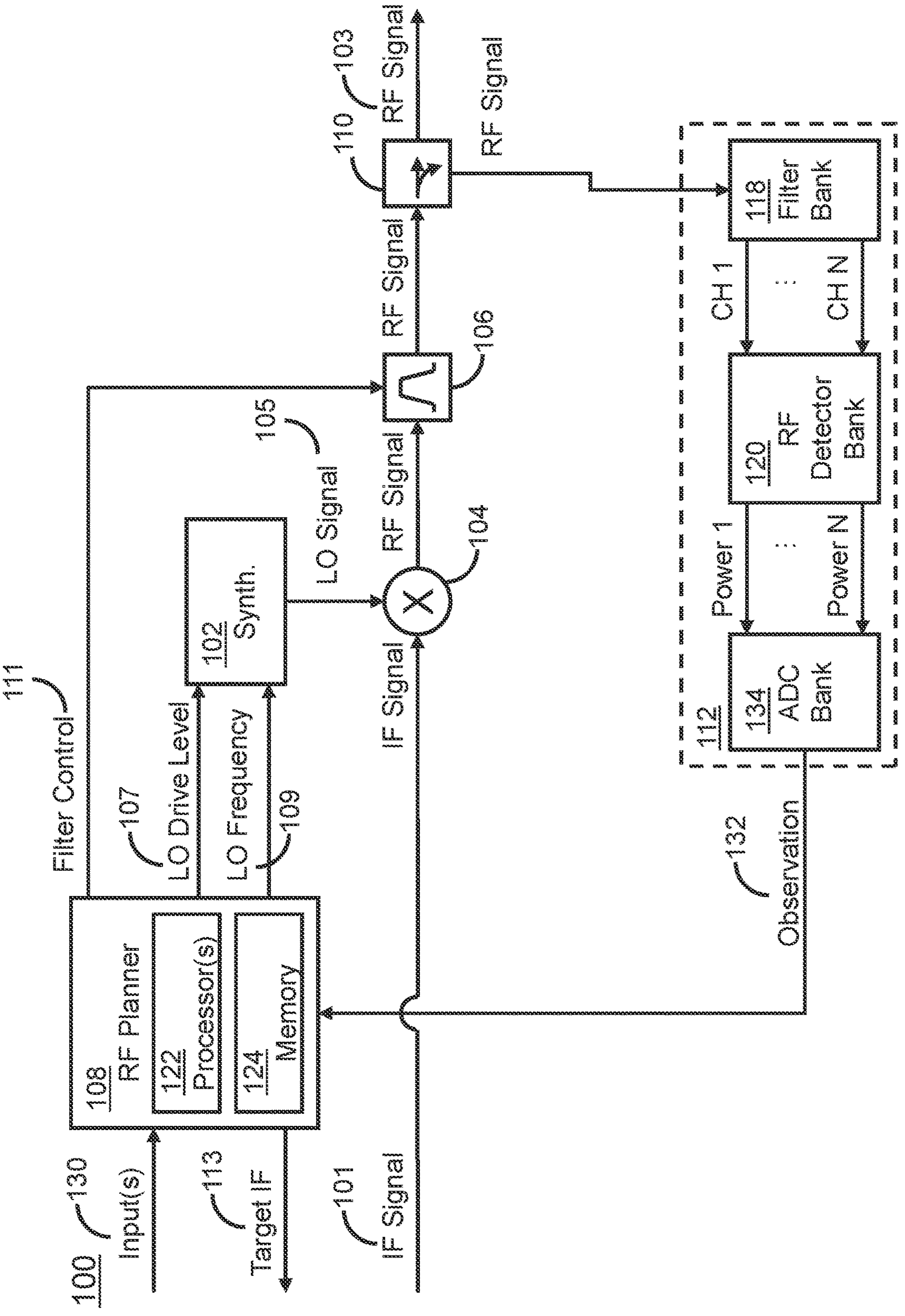
FIG. 1A depicts block diagram of an adaptive frequency converter configured for up converting, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a Radio Frequency Up/Down Converter with Real-Time Adaptation. The radio frequency converter up converts intermediate frequencies to radio frequencies and down converts radio frequencies to intermediate frequencies. The radio frequency converter includes a synthesizer, a mixer, a tunable bandpass filter, and a radio frequency planner. The radio frequency planner adapts the IF signal, synthesizer, mixer, and tunable bandpass filter based on inputs received by the radio frequency planner. The radio frequency planner performs the adaption in real-time.

U.S. Pat. No. 6,876,839B2, titled "Intermediate frequency planning in radio transmitters and receivers"; U.S. Pat. No. 7,039,385B1, titled "Method and apparatus for automatic center frequency tuning of tunable bandpass filters"; U.S. Pat. No. 10,979,091B1, titled "Reconfigurable wideband image suppressing receiver"; U.S. Patent Publication Number US20230056713A1, titled "Dynamically optimized radio receiver"; U.S. Pat. No. 8,149,896B2, titled "Spur suppression for a receiver in a wireless communication system"; U.S. Pat. No. 8,874,060B2, titled "Radio frequency (RF) receiver with frequency planning and method therefor"; are incorporated herein by reference in the entirety.

List of Terms:

Analog-to-Digital Converter (ADC)
Adaptive Up/Down-converter (AUDC)
Direct digital synthesis (DDS)
instantaneous bandwidth (IBW)
intermediate frequency (IF)
local oscillator (LO)
Multi-function RF (MFRF)
radio frequency (RF)
up/down converter (UDC)

Figure 1B:
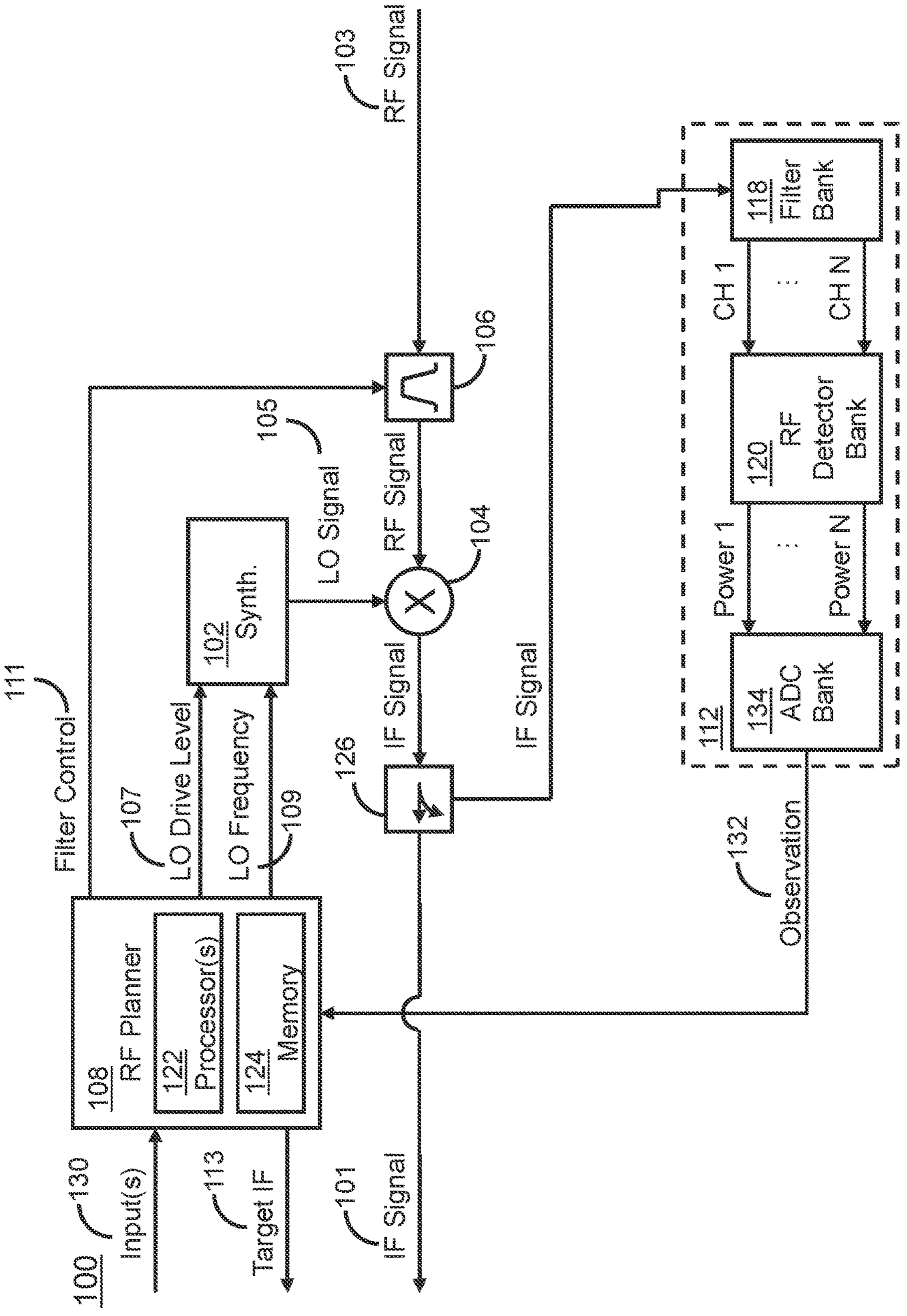
FIG. 1B depicts block diagram of an adaptive frequency converter configured for down converting, in accordance with one or more embodiments of the present disclosure.
Figure 1C:
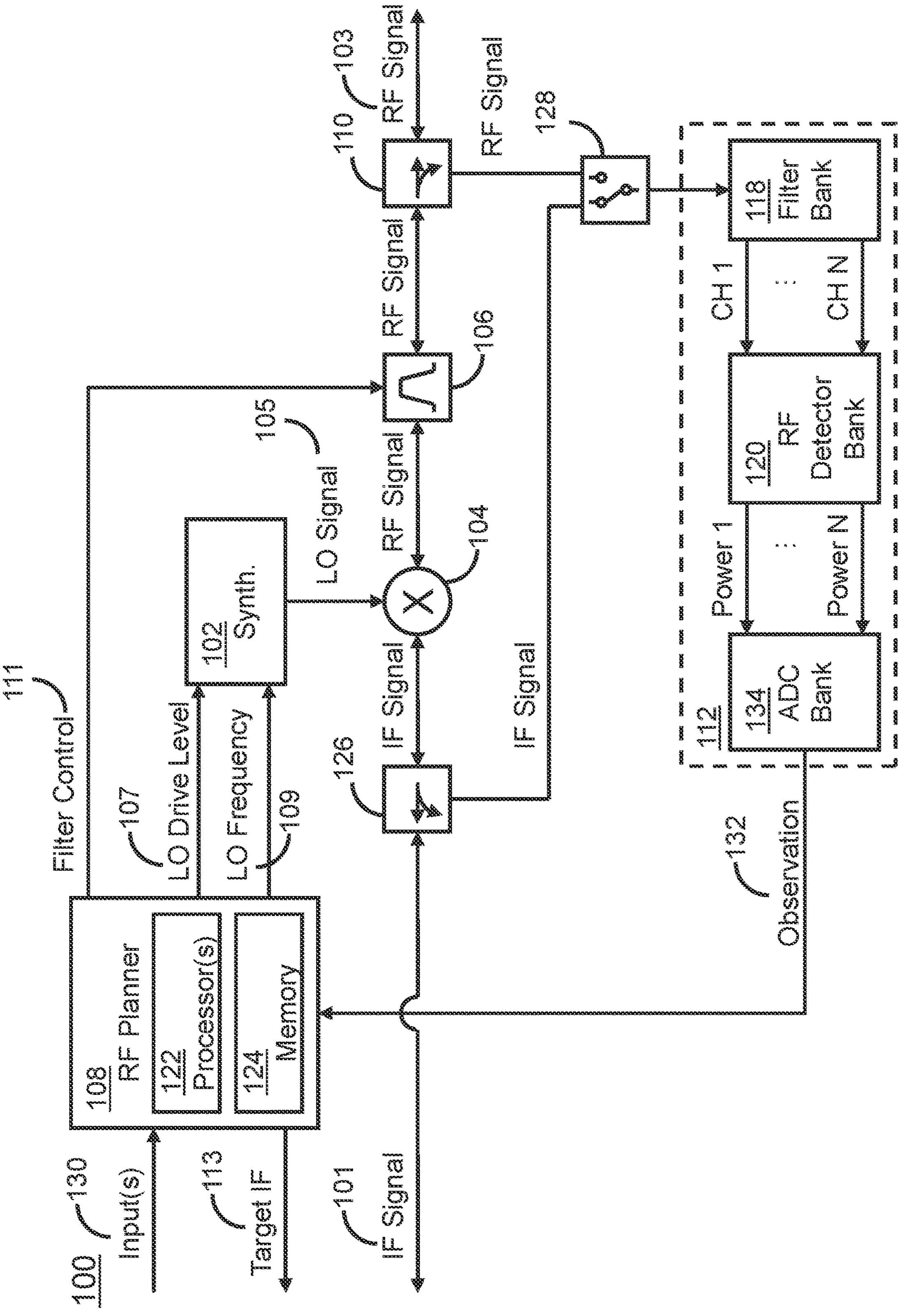
FIG. 1C depicts block diagram of an adaptive frequency converter configured for up/down converting, in accordance with one or more embodiments of the present disclosure.
Figure 1D:
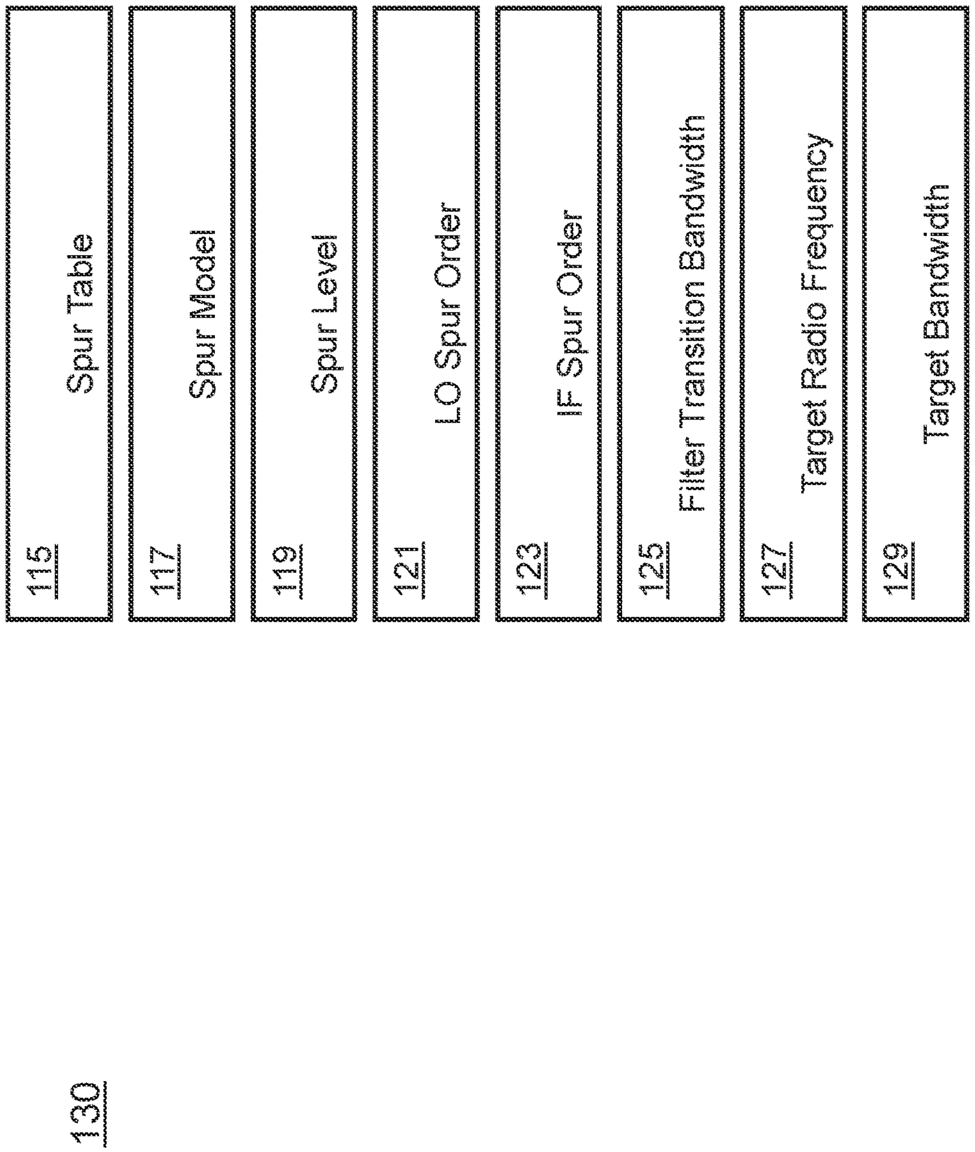
FIG. 1D depicts block diagram of inputs to a radio frequency planner, in accordance with one or more embodiments of the present disclosure.

Referring now to FIG. 1A-1C, an adaptive frequency converter 100 is described, in accordance with one or more embodiments of the present disclosure. The adaptive frequency converter 100 may also be referred to as an up converter, a down converter, an up/down converter, an adaptive up/down converter, a radio frequency up/down converter, and the like. The adaptive frequency converter 100 may be configured for up-converting an intermediate frequency (IF) signal to a radio frequency (RF) signal. The adaptive frequency converter 100 may also be configured for down-converting the RF signal to the IF signal. The adaptive frequency converter 100 is configured for automatic frequency planning of the signals. The adaptive frequency converter 100 includes one or more components, such as, but not limited to, a synthesizer 102, a mixer 104, a tunable bandpass filter 106, a radio frequency planner 108, a directional coupler 110, a spur measurement circuit 112, a directional coupler 126, a switch 128, and the like.

The adaptive frequency converter 100 is configured to up-convert an IF signal 101 to an RF signal 103. The adaptive frequency converter 100 is also configured to down-convert the RF signal 103 to the IF signal 101.

The IF signal 101 is a carrier wave which is shifted as an intermediate step in transmission or reception. The IF signal 101 is a product of the RF signal 103 and the LO signal 105 when down-converting. The IF signal 101 may have a sinusoid carrier signal.

The RF signal 103 is a carrier wave transmitted and received over the air. The RF signal 103 is a product of the IF signal 101 and the LO signal 105 when up-converting. The RF signal 103 may have a sinusoid carrier signal.

The adaptive frequency converter 100 includes the synthesizer 102. The synthesizer 102 is a highly dynamic RF synthesizer. The synthesizer 102 generates a LO signal 105. The synthesizer 102 generates the LO signal 105 based on a LO drive level 107 and a LO frequency 109. The synthesizer 102 is reprogrammable to change the LO signal 105 by changing the LO drive level 107 and the LO frequency 109.

The LO drive level 107 is the power of that the LO signal 105. The LO drive level 107 impacts the output power level of the mixer 104. The LO drive level 107 also impacts the output level of the nonlinear products. Higher values for the LO drive level 107 cause the mixer 104 to produce more nonlinearities.

The LO frequency 109 is the frequency of the LO signal 105.

The adaptive frequency converter 100 includes the mixer 104. The mixer 104 is a multiplier. The mixer 104 is also a nonlinear device. The mixer 104 receives the LO signal from the synthesizer 102. The mixer 104 may include a variety of components or arrangements of cooperative components which mix the signals (e.g., IF signal 101, RF signal 103, LO signal 105).

The mixer 104 may be configured to convert (i.e., up-convert) the IF signal 101 to the RF signal 103. The mixer 104 mixes the IF signal 101 and the LO signal 105 to generate the RF signal 103 during up-convert. Many possible combinations of IF signals 101 and LO signals 105 may result in the RF signal 103.

The mixer 104 introduces at least one unwanted spurious product (e.g., IF+LO or IF-LO) when up-converting. Nonlinearities of the mixer 104 may also introduce additional spurious products (e.g., cos(2IF+2LO), etc.) when up-converting.

The mixer 104 may also be configured to convert (i.e., down-convert) RF signal 103 to the IF signal 101. The mixer 104 mixes the RF signal 103 and the LO signal 105 to generate the IF signal 101 during down-convert. Many possible combinations of RF signals 103 and LO signals 105 may result in the IF signal 101.

The mixer 104 introduces at least one unwanted spurious product (e.g., RF+LO or RF-LO) when down-converting. Nonlinearities of the mixer 104 may also introduce additional spurious products (e.g., cos(2RF+2LO), etc.) when down-converting.

The adaptive frequency converter 100 includes the tunable bandpass filter 106. The tunable bandpass filter 106 may also be referred to as an RF filter. The tunable bandpass filter 106 includes a filter center frequency and a filter bandwidth. The filter center frequency and filter bandwidth may also be referred to as a center frequency and a bandwidth of the tunable bandpass filter 106, respectively. The tunable bandpass filter 106 filters signals which are outside of the filter center frequency and filter bandwidth. For example, the tunable bandpass filter 106 filters signals from the RF signal 103. The signals are outside of the filter center frequency and filter bandwidth.

The filter center frequency and/or filter bandwidth are tunable. The tunable bandpass filter 106 tunes the filter center frequency and/or filter bandwidth based on a filter control signal 111. The filter center frequency may be tuned between a minimum center frequency, a maximum center frequency, and center frequencies therebetween. The filter center frequency of the tunable bandpass filter 106 may be a radio frequency. For example, the center frequency of the tunable bandpass filter 106 may be tunable between 1 GHz and 30 GHz, although this is not intended to be limiting. The filter bandwidth may be tuned between a minimum bandwidth, a maximum bandwidth, and bandwidths therebetween. The filter center frequency and filter bandwidth may be collectively referred to as a passband. The tunable bandpass filter 106 may include a variety of components or arrangements of cooperative components which are tunable to a passband.

The tunable bandpass filter 106 is coupled to the mixer 104. The tunable bandpass filter 106 receives the RF signal 103 from the mixer 104. The tunable bandpass filter 106 filters the RF signal 103 at the filter center frequency and the filter bandwidth. The RF signal 103 received from the mixer 104 may include spurious signals introduced by the mixer 104. The tunable bandpass filter 106 filters the spurious signals introduced into the RF signal 103 by the mixer 104 during transmit (e.g., when the IF signal 101 is up-converted to the RF signal 103).

The tunable bandpass filter 106 is also configured to receive the RF signal 103 during down-convert. For example, the tunable bandpass filter 106 may be coupled to one or more antenna. The tunable bandpass filter 106 filters interfering signals from the RF signal 103 during receive (e.g., when the RF signal 103 is down-converted to the IF signal 101). The interfering signals may be introduced by any number of transmitters.

The adaptive frequency converter 100 includes the radio frequency planner 108. The radio frequency planner 108 may also be referred to as an RF frequency planner or the like. The radio frequency planner 108 includes one or more components, such as, but not limited to, one or more processors 122, memory 124, and the like.

The processors 122 may include any processor or processing element. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs), one or more central-processing units (CPUs)). In this sense, the processing hardware may include any device configured to execute algorithms and/or instructions (e.g., program instructions stored in memory). Moreover, processing hardware may include a processor or logic elements suitable for carrying out at least a portion of the steps described in the present disclosure. The one or more processors 122 are configured to execute program instructions maintained on the memory 124 causing the radio frequency planner 108 to perform any of the various functions described herein. Therefore, the above description should not be interpreted as a limitation on the embodiments of the present disclosure but merely as an illustration.

The memory 124 may include any storage medium suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a housing with the one or more processors.

The radio frequency planner 108 receives one or more inputs 130. The inputs 130 may be received from a software-defined radio (e.g., received from the software-defined radio 202). The inputs 130 may include one or more of a spur table 115, a spur model 117, a spur level 119, a LO spur order 121, an IF spur order 123, a filter transition bandwidth 125, a target radio frequency 127, a target bandwidth 129, and the like.

The radio frequency planner 108 may receive spur table 115. The spur table 115 includes measurements of how the synthesizer 102, the mixer 104, and/or the tunable bandpass filter 106 respond to the IF signal 101, the RF signal 103, and/or the LO signal 105.

The radio frequency planner 108 may receive spur model 117. The spur model 117 may include any model used to predict spurious products generated by mixing the LO signal 105 with the IF signal 101 and/or the RF signal 103. For example, the spur model 117 may include a "Henderson model", linear phase-reversal model, non-linear microwave models, and the like. In some embodiments, the spur model 117 may be based, at least in part, on the components used in the mixer 104. The radio frequency planner 108 may calculate, using the spur model 117, all combinations of the IF signal 101, LO signal 105, LO drive level 107, and filter control signal 111 that result in the target radio frequency 127, target bandwidth 129, and spur levels 119 out to the LO spur order 121 and IF spur order 123.

The radio frequency planner 108 may receive spur level 119. The spur level 119 indicates a maximum level of spurious emissions. The spur level 119 may be measured in decibels relative to the carrier (dBc). For example, the spur level 119 may include a spur level of 50 dBc, although this is not intended as a limitation of the present disclosure. In this example, spurs can be within 50 dB of the RF signal 103. The spur level 119 may be set based on requirements of a waveform transmitted via the RF signal 103. The spur level 119 may change depending upon which waveform is transmitted. Different waveforms may specific different acceptable spur levels.

The radio frequency planner 108 may receive LO spur order 121 and/or IF spur order 123. The LO spur order 121 and/or IF spur order 123 may refer to high-order spurious responses for which the radio frequency planner 108 will search. The LO spur order 121 and/or IF spur order 123 defines the dimensions of a table used by the radio frequency planner 108 to calculate using the spur model 117. The radio frequency planner 108 ignores spurs which are beyond the LO spur order 121 and/or IF spur order 123. The LO spur order 121 and/or IF spur order 123 may be integers. For example, the LO spur order 121 and/or IF spur order 123 may be 5th order, 10th order, and the like. A 5th order IF spur order, means that 5 times the IF frequency, has a given spur level. It is contemplated that the LO spur order 121 and/or IF spur order 123 may be parameters from a data sheet of the mixer 104.

The radio frequency planner 108 may receive a filter transition bandwidth 125. The filter transition bandwidth 125 may also be referred to as a filter transition space, transition band, skirt, and the like. The filter transition bandwidth 125 is a range of frequencies that allows a transition between a passband and a stopband of the tunable bandpass filter 106. The filter transition bandwidth 125 defines how sharp the cutoff is of the tunable bandpass filter from the passband to the stopband. The filter transition bandwidth 125 may be based on one or more requirements of a waveform sent over the RF signal 103.

The radio frequency planner 108 may receive target radio frequency 127. The target radio frequency 127 is the target frequency of the RF signal 103. For example, the target radio frequency 127 is the target center frequency of the RF signal 103 output or input, depending on transmit or receive. The target radio frequency 127 may vary depending upon what waveform is currently used. For example, the target radio frequency 127 may vary between 1 GHz and 30 GHz, or more.

The radio frequency planner 108 may receive the target bandwidth 129. The target bandwidth 129 may also be referred to as a dB bandwidth. The target bandwidth 129 refers to a target bandwidth of the RF signal 103 at the center frequency. The target bandwidth 129 includes a power level of the signal which is defined relative to a maximum power level of the signal. For example, the target bandwidth 129 may include an RF 1 dB bandwidth, an RF 3 dB bandwidth, an RF 10 dB bandwidth, and the like.

The radio frequency planner 108 is configured to set one or more of the LO drive level 107, the LO frequency 109, the filter control signal 111, and a target intermediate frequency 113. The radio frequency planner 108 may set the LO drive level 107, the LO frequency 109, the filter control signal 111, and/or the target intermediate frequency 113 based on the spur table 115, spur model 117, spur level 119, LO spur order 121, IF spur order 123, filter transition bandwidth 125, target radio frequency 127, and/or target bandwidth 129.

The radio frequency planner 108 may determine combinations of the IF signal 101 and the LO signal 105 which sum to the target radio frequency 127. The radio frequency planner 108 performs a mathematical method of choosing between combinations of LO&IF frequencies to reach a determined RF output. The radio frequency planner 108 may determine the combinations using the spur model 117. The radio frequency planner 108 may determine the combination of the IF signal 101 and the LO signal 105 which has a highest power in the target bandwidth 129 with a least spur power outside of the target bandwidth 129. The radio frequency planner 108 may choose between many combinations of the LO&IF frequencies to reach a determined RF output.

The radio frequency planner 108 may output the LO drive level 107 and LO frequency 109 to the synthesizer 102. The radio frequency planner 108 may output the filter control signal 111 to the tunable bandpass filter 106. The radio frequency planner 108 may output the target intermediate frequency 113 to the software-defined radio 202.

The radio frequency planner 108 performs a search. The search is harder where the LO order 121 and/or IF spur order 123 are higher. In some embodiments, the radio frequency planner 108 may ignore spurs beyond $5^{th}$ order, $10^{th}$ order, or the like. For example, the maximum level of spurious emissions may be out to the $10^{th}$ spur order or the like.

The radio frequency planner 108 may perform the spur model 117 on the combinations in real-time. Similarly, the radio frequency planner 108 may adapt the LO drive level 107, the LO frequency 109, the filter control signal 111, and the target intermediate frequency 113 in real-time.

In some embodiments, the adaptive frequency converter 100 is configured as an up-converter. In some embodiments, the adaptive frequency converter 100 includes the directional coupler 110. The directional coupler 110 is coupled after the tunable bandpass filter 106. The directional coupler 110 is coupled between the tunable bandpass filter 106 and the spur measurement circuit 112. For example, the directional coupler 110 is coupled between the tunable bandpass filter 106, the spur measurement circuit 112, and the antenna 204. The directional coupler 110 couples the RF signal 103 from the tunable bandpass filter 106 to the spur measurement circuit 112. The mixer 104 introduces nonlinearities to the RF signal 103 during up-convert that cause the spurious emissions.

In some embodiments, the adaptive frequency converter 100 is configured as a down-converter. In some embodiments, the adaptive frequency converter 100 includes the directional coupler 126. The directional coupler 126 is coupled before the mixer 104. The directional coupler 126 is coupled between the mixer 104 and the spur measurement circuit 112. For example, the directional coupler 126 is coupled between the mixer 104, the spur measurement circuit 112, and the software-defined radio 202. The directional coupler 110 couples the IF signal 101 from the mixer 104 to the spur measurement circuit 112. The mixer 104 introduces nonlinearities to the IF signal 101 during down-convert that cause the spurious emissions.

In this regard, the receive direction and transmit direction are similar, except the position of the directional coupler 110 and the directional coupler 126 are position in different locations to couple the signal which has the nonlinearities introduced by the mixer 104.

The adaptive frequency converter 100 includes the spur measurement circuit 112. The spur measurement circuit 112 may also be referred to as a feedback circuit or the like. The spur measurement circuit 112 measures spurious products. The spur measurement circuit 112 measures spurious products in a coupled signal. The spur measurement circuit 112 enables accurate real-time measurement of spurious products. The spur-measurement circuit 112 provides a feedback path for real-time adaptation of frequency plans. The spur measurement circuit 112 generates the observation signal 132 based on the RF signal 103 during up-convert and based on the IF signal 101 during down-convert.

In some embodiments, the spur measurement circuit 112 is coupled to the directional coupler 110. In some embodiments, the coupled signal is the RF signal 103. The spur measurement circuit 112 receives the RF signal 103 from the directional coupler 110. In some embodiments, the spur measurement circuit 112 measures spurious products in the RF signal 103 when the adaptive frequency converter 100 is configured for up converting. The spur measurement circuit 112 generates the observation signal 132 based on the RF signal 103.

In some embodiments, the spur measurement circuit 112 is coupled to the directional coupler 126. In some embodiments, the coupled signal is the IF signal 101. The spur measurement circuit 112 receives the IF signal 101 from the directional coupler 126. In some embodiments, the spur measurement circuit 112 measures spurious products in the IF signal 101 when the adaptive frequency converter 100 is configured for down converting. The spur measurement circuit 112 generates the observation signal 132 based on the IF signal 101.

The spur measurement circuit 112 includes one or more components, such as, but not limited to, a filter bank 118, radio frequency detector bank 120, analog-to-digital converter bank 134, and the like.

The spur measurement circuit 112 includes the filter bank 118. The filter bank 118 may also be referred to as a channelizing filter bank. The filter bank 118 includes a bank of bandpass filters. The filter bank 118 filters the coupled signal (e.g., the IF signal 101 and/or RF signal 103) into a plurality of channels. For example, the filter bank 118 filters the coupled signal into channels 1 through N, where N is an integer. For example, the channelizing filter bank may split the coupled signal into 1 GHz channels from 1 to 30 GHz, although this is not intended as a limitation of the present disclosure.

The spur measurement circuit 112 includes the radio frequency detector bank 120. The radio frequency detector bank 120 is coupled to the filter bank 118. The radio frequency detector bank 120 includes a plurality of RF detectors. For example, the radio frequency detector bank 120 includes at least one RF detector for each of the channels. The radio frequency detector bank 120 determines a power for each of the channels. The power may include spur power and/or a signal power.

The spur measurement circuit 112 includes the analog-to-digital converter bank 134. The analog-to-digital converter bank 134 is coupled to the radio frequency detector bank 120. The analog-to-digital converter bank 134 converts the powers to an observation signal 132. The observation signal 132 includes a plurality of digital signals which each represent the spur power of one of the channels of the filter bank 118.

The observation signal 132 may be considered an analog equivalent of a n-point Fast-Fourier Transform (FFT) of the coupled signal (e.g., the IF signal 101, the RF signal 103). The observation signal 132 includes powers for a plurality of channels (i.e., a power for each of the N-channels).

The spur measurement circuit 112 is coupled to the radio frequency planner 108. For example, the analog-to-digital converter bank 134 is coupled to the radio frequency planner 108. The spur measurement circuit 112 provides the observation signal 132 to the radio frequency planner 108.

The radio frequency planner 108 may use the observation signal 132 to iteratively adapt the LO drive level 107, LO frequency 109, filter control signal 111, and target intermediate frequency 113. The radio frequency planner 108 iteratively adapts the LO drive level 107, LO frequency 109, filter control signal 111, and target intermediate frequency 113 based on the spur power. For example, the radio frequency planner 108 may use the observation signal 132 as closed-loop feedback. The radio frequency planner 108 iteratively adapts the LO drive level 107, LO frequency 109, filter control signal 111, and/or target intermediate frequency 113 based on the observation signal 132. It is contemplated that the radio frequency planner 108 on the order of microseconds (e.g., every microsecond). Iteratively adapting the LO drive level 107, the LO frequency 109, the filter control signal 11, and/or the target intermediate frequency 113 reduces a spurious product in the signal (i.e., IF signal 101 during down-convert, RF signal 103 during up-convert) introduced by the mixer 104.

In some embodiments, the radio frequency planner 108 stores the LO drive level 107, LO frequency 109, filter control signal 111, target intermediate frequency 113, and observation signal 132 in memory 124. The radio frequency planner 108 may perform reinforcement learning on the LO drive level 107, LO frequency 109, filter control signal 111, target intermediate frequency 113, and observation signal 132 stored in memory to iteratively adapt the LO drive level 107, LO frequency 109, filter control signal 111, and the target intermediate frequency 113. For example, the radio frequency planner 108 may perform a reinforcement learning algorithm. The reinforcement learning algorithm may receive rewards based on the spur power associated with the LO drive level 107, LO frequency 109, filter control signal 111, target intermediate frequency 113.

In some embodiments, the adaptive frequency converter 100 includes switch 128. The switch 128 is coupled to the spur measurement circuit 112, the directional coupler 110, and the directional coupler 126. The switch 128 switches the spur measurement circuit 112 between measuring the RF signal 103 and measuring the IF signal 101.

Although the adaptive frequency converter 100 is described as including the switch 128, this is not intended as a limitation of the present disclosure. It is contemplated that there are multiple ways to combine the up converter and down converter functions of the adaptive frequency converter 100. In some embodiments, the up converter and down converter may or may not share the synthesizer 102, mixer 104, the tunable bandpass filter 106, RF planner, and/or spur measurement circuit 112. For example, the up converter and down converter may include separate of the synthesizer 102, mixer 104, the tunable bandpass filter 106, radio frequency planner 108, and/or spur measurement circuit 112. In some embodiments, the up converter and the down converter share the radio frequency planner 108. The radio frequency planner 108 may have separate applications running for processing transmit and receive. The radio frequency planner 108 may store separate data for transmit and receive. For example, the radio frequency planner 108 may perform separate reinforcement learning for transmit and receive.

Figure 2:
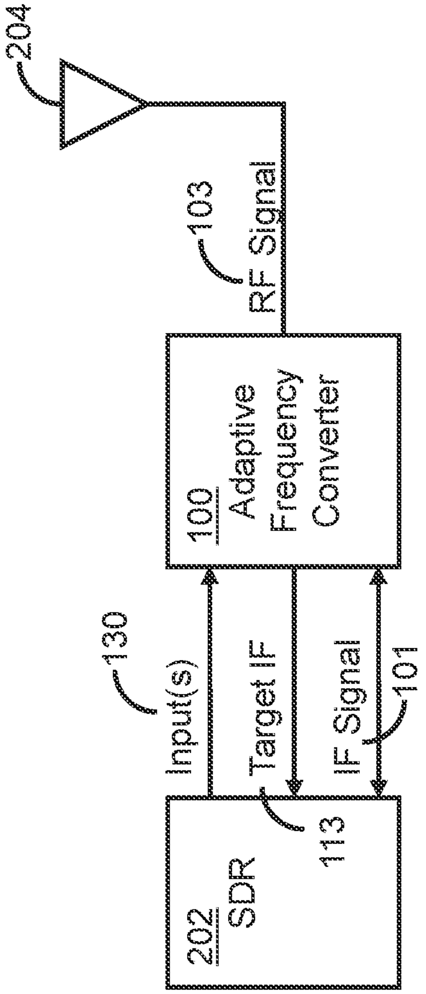
FIG. 2 depicts a block diagram of a radio system, in accordance with one or more embodiments of the present disclosure.

Referring now to FIG. 2, a radio system 200 is described, in accordance with one or more embodiments of the present disclosure. The radio system 200 includes one or more components, such as, but not limited to, a software-defined radio 202, adaptive frequency converter 100, antenna 204, and the like.

The radio system 200 includes the software-defined radio 202. The software-defined radio 202 may include a Direct digital synthesis (DDS) SDR. The software-defined radio 202 may perform one or more functions. For example, the software-defined radio 202 may act as a waveform processor, performing actions such as demodulation. By way of another example, the software-defined radio 202 may include an IF filter. The SDR performs IF filtering and the like.

The software-defined radio 202 is coupled to the adaptive frequency converter 100. The software-defined radio 202 provides the inputs 130 to the radio frequency planner 108. For example, the software-defined radio 202 may provide one or more of the spur table 115, spur model 117, spur level 119, LO spur order 121, IF spur order 123, filter transition bandwidth 125, target radio frequency 127, and/or target bandwidth 129 to the radio frequency planner 108.

The software-defined radio 202 receives the target intermediate frequency 113 from the radio frequency planner 108. The software-defined radio 202 adjusts the IF signal 101 based on the target intermediate frequency 113. For example, the software-defined radio 202 generates the IF signal 101 at the target intermediate frequency 113.

The radio system 200 includes the antenna 204. The antenna 204 may include any suitable antenna, such as, but not limited to, a dipole antenna, array antenna, and the like. The antenna 204 may be coupled to the adaptive frequency converter 100. For example, the antenna 204 may be coupled to the tunable bandpass filter 106 or the directional coupler 110. The RF signal 103 may be transmitted from and/or received by the antenna 204.

Figure 3:
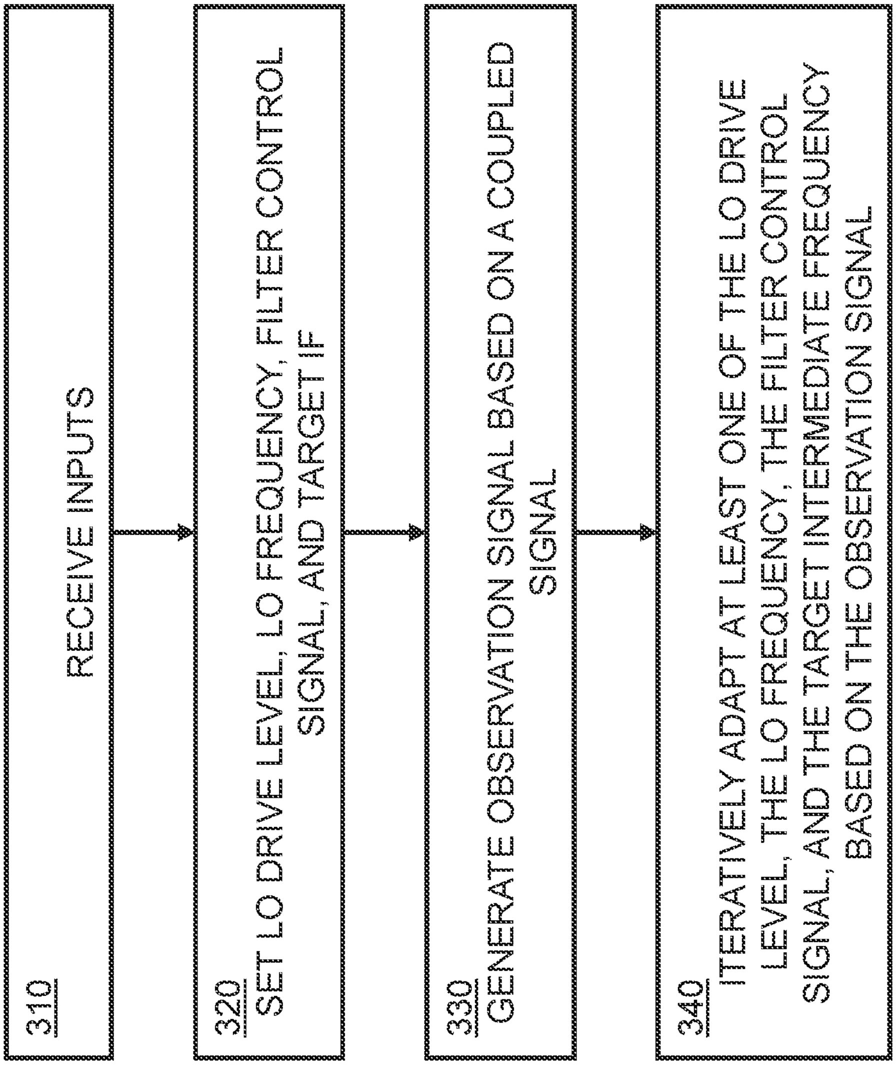
FIG. 3 depicts a flow diagram of a method, in accordance with one or more embodiments of the present disclosure.

Referring now to FIG. 3, a method 300 is described, in accordance with one or more embodiments of the present disclosure. The method 300 provides a description of the signal flow through the adaptive frequency converter 100. The embodiments and the enabling technology described previously herein in the context of the adaptive frequency converter 100 should be interpreted to extend to the method. For example, the embodiments and enabling technology of the method should be interpreted to be implemented by the processors of the radio frequency planner 108. It is further recognized, however, that the method is not limited to the adaptive frequency converter 100.

In a step 310, the radio frequency planner 108 receives the inputs 130. For example, the radio frequency planner 108 receives the spur table 115, spur model 117, spur level 119, LO spur order 121, IF spur order 123, filter transition bandwidth 125, target radio frequency 127, and/or target bandwidth 129. The radio frequency planner 108 receives the inputs 130 from the software-defined radio 202.

In a step 320, the radio frequency planner 108 sets the LO drive level LO drive level 107, the LO frequency 109, the filter control signal 111, and the target intermediate frequency 113. The LO drive level LO drive level 107, the LO frequency 109, the filter control signal 111, and the target intermediate frequency 113 are set based on the spur table 115, spur model 117, spur level 119, LO spur order 121, IF spur order 123, filter transition bandwidth 125, target radio frequency 127, and/or target bandwidth 129. The radio frequency planner 108 may determine a frequency plan. The radio frequency planner 108 dynamically generates the frequency plan based on the inputs 130. The frequency plan includes the LO drive level 107, the LO frequency 109, the filter control signal 111, and the target intermediate frequency 113. The frequency plan is expected to be spur free or contain minimum spur content. The radio frequency planner 108 predicts a level of spurs based on the spur table 115 and/or spur model 117. The radio frequency planner 108 determines all possible combinations of LO drive level 107, the LO frequency 109, the filter control signal 111, and the target intermediate frequency 113 that result in the RF signal 103 with the target radio frequency 127 with a spur power at the LO spur order 121 and IF spur order 123 below the spur level 119. The radio frequency planner 108 sets the LO drive level 107, the LO frequency 109, the filter control signal 111, and the target intermediate frequency 113 with the best predicted performance. The radio frequency planner 108 may identify the best predicted performance based on the total power level of the spurs, or the like. The radio frequency planner 108 then commands the software-defined radio 202 to the target intermediate frequency 113, commands the synthesizer 102 to the LO drive level 107 and LO frequency 109, and commands the tunable bandpass filter 106 to the filter control signal 111.

In a step 330, the spur measurement circuit 112 receives a coupled signal and generates the observation signal 132 based on the coupled signal. For example, the coupled signal is the RF signal 103. The RF signal 103 is passed through the directional coupler 110 to the filter bank 118. The filter bank 118 filters the RF signal 103 into N-channels. The radio frequency detector bank 120 measures the spur power of the N-channels. The spur power output from the radio frequency detector bank 120 is digitized by the analog-to-digital converter bank 134 to generate the observation signal 132.

In a step 340, the radio frequency planner 108 iteratively adapts at least one of the LO drive level 107, the LO frequency 109, the filter control signal 111, and the target intermediate frequency 113 based on the observation signal 132. The radio frequency planner 108 may adapts at least one of the LO drive level 107, the LO frequency 109, the filter control signal 111, and the target intermediate frequency 113 to minimize the spur power in every channel except for the channel which includes the RF signal 103. The radio frequency planner 108 iteratively adapts the frequency plan based on measured emissions. The radio frequency planner 108 may perform any number of iterative adaptions. For example, the radio frequency planner 108 may perform several hundred of the iterative adaptions per second.

The radio frequency planner 108 may or may not include a closed-form solution. For example, the radio frequency planner 108 may change at least one of the LO drive level 107, the LO frequency 109, the filter control signal 111, and the target intermediate frequency 113 based on the observation signal 132 using an unsupervised reinforcement learning or a deterministic optimization algorithm. The optimization problem is well served to a machine learning implementation, such as a reinforcement learning algorithm or the like.

For example, the RF signal 103 may have a target radio frequency 127 at 18 GHz. A 6 GHz IF signal plus a 12 GHz LO signal sums to gives 18 GHz RF output. In this example, the radio frequency planner 108 minimizes the spur power in channels 1-17 GHz and 19-30 GHz and maximizes the power in the 18 GHz channel.

Referring generally again to FIGS. 1A-3.

The adaptive frequency converter 100 enables adaptive, agile, and autonomous RF functions to be developed and deployed. The adaptive frequency converter 100 has adaptive control at run time even when waveform parameters are not known at design time. The adaptive frequency converter 100 enables adaptive, agile, and autonomous multi-function RF (MFRF) systems, where virtually unlimited and unknown combinations of desired RF frequency and instantaneous bandwidth (IBW) are possible and are unknown at the time of hardware design. Multifunction radio frequency (MFRF) paradigms dictate that parameters of use may not be known at the time a system is designed, embedding learning or adaptive control within the RF hardware improves performance under this unknown set of parameters.

The adaptive frequency converter 100 has a size and power consumption much lower than an ultra-wideband RF data converter. The size and power consumption of the adaptive frequency converter 100 enables the use of the adaptive frequency converter 100 for disadvantaged users (i.e., small-unmanned vehicles).

The adaptive frequency converter 100 is modular. For example, the channels of the spur measurement circuit 112 are modular to any number of channels. The modular nature of the spur measurement circuit 112 enables the adaptive frequency converter 100 to scale to for total frequency coverage or granularity of feedback measurement. The frequency coverage or granularity of feedback makes the adaptive frequency converter 100 suitable for several waveforms.

In some embodiments, the adaptive frequency converter 100 may autonomously compensate for a temperature of the mixer 104. For example, if mixer 104 is cold then the mixer 104 may be overly sensitive to the LO drive level 107. The radio frequency planner 108 may perform reinforcement learning to correct for the spur orders without knowledge of the temperature of the mixer 104. When the mixer is cold, the radio frequency planner 108 autonomously decreases the LO drive level 107 based on the observation signal 132. The radio frequency planner 108 may change the LO drive level 107 without changing the LO frequency 109 and the target IF frequency 113. For example, the radio frequency planner 108 may first change the radio frequency planner 108 while keeping the LO frequency 109 and the target IF frequency 113 constant.

Although the spur measurement circuit 112 is described as including the filter bank 118, the radio frequency detector bank 120, and the analog-to-digital converter bank 134, this is not intended as a limitation of the present disclosure. It is further contemplated that the spur measurement circuit 112 may include an ultra-wideband ADC. For example, the ultra-wideband ADC may be configured to process 20 GHz of IBW. However, the ultra-wideband ADCs are not as precise as and/or use more power than the combination of the filter bank 118, the radio frequency detector bank 120, and the analog-to-digital converter bank 134. Thus, the filter bank 118, the radio frequency detector bank 120, and the analog-to-digital converter bank 134 are desirable to provide wideband spur measurement.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the methods described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all material advantages. The form described is merely explanatory, and it is the intention of the following claims to encompass and include such changes. Furthermore, it is to be understood that the invention is defined by the appended claims.

What is claimed:

1. An adaptive frequency converter comprising:

a synthesizer; wherein the synthesizer is configured to generate a local oscillator signal based on a local oscillator drive level and a local oscillator frequency;

a mixer; wherein the mixer receives the local oscillator signal from the synthesizer; wherein the mixer mixes an intermediate frequency signal with the local oscillator signal to generate a radio frequency signal;

a tunable bandpass filter comprising a filter center frequency and a filter bandwidth; wherein the tunable bandpass filter is configured to tune the filter center frequency and the filter bandwidth based on a filter control signal; wherein the tunable bandpass filter receives the radio frequency signal from the mixer and filters the radio frequency signal at the filter center frequency and the filter bandwidth;

a directional coupler;

a spur measurement circuit; wherein the directional coupler is coupled between the tunable bandpass filter and the spur measurement circuit; wherein the spur measurement circuit is configured to receive the radio frequency signal from the directional coupler; wherein the spur measurement circuit is configured to generate an observation signal based on the radio frequency signal; wherein the observation signal comprises a plurality of powers for a plurality of channels; and a radio frequency planner comprising one or more processors and a memory; wherein the one or more processors are configured to execute program instructions maintained on the memory causing the radio frequency planner to:

receive at least a spur level, a local oscillator spur order, an intermediate frequency spur order, a target radio frequency, and a target bandwidth;

set at least the local oscillator drive level, the local oscillator frequency, the filter control signal, and a target intermediate frequency based on at least the spur level, the local oscillator spur order, the intermediate frequency spur order, the target radio frequency, and the target bandwidth; and iteratively adapt at least one of the local oscillator drive level, the local oscillator frequency, the filter control signal, or the target intermediate frequency based on the observation signal;

wherein the spur measurement circuit comprises:

a filter bank; wherein the filter bank is coupled to the directional coupler; wherein the filter bank filters the radio frequency signal into the plurality of channels;

a radio frequency detector bank; wherein the radio frequency detector bank is coupled to the filter bank; wherein the radio frequency detector bank determines the plurality of powers for each of the plurality of channels; and an analog-to-digital converter bank; wherein the analog-to-digital converter bank is coupled to the radio frequency detector bank; wherein the analog-to-digital converter bank converts the plurality of powers to the observation signal.

2. The adaptive frequency converter of claim 1, wherein the program instructions maintained on the memory causing the radio frequency planner to:

receive a spur table; and set at least the local oscillator drive level, the local oscillator frequency, the filter control signal, and the target intermediate frequency based on the spur table.

3. The adaptive frequency converter of claim 1, wherein the program instructions maintained on the memory causing the radio frequency planner to:

receive a spur model; and calculate, using the spur model, combinations of the intermediate frequency signal, the local oscillator signal, the local oscillator drive level, and the filter control signal that result in the target radio frequency, the target bandwidth, and the spur level out to the local oscillator spur order and the intermediate frequency spur order.

4. The adaptive frequency converter of claim 1, wherein the program instructions maintained on the memory causing the radio frequency planner to:

receive a filter transition bandwidth; and set at least the local oscillator drive level, the local oscillator frequency, the filter control signal, and the target intermediate frequency based on the filter transition bandwidth.

5. The adaptive frequency converter of claim 1, wherein iteratively adapting at least one of the local oscillator drive level, the local oscillator frequency, the filter control signal, or the target intermediate frequency reduces a spurious product in the radio frequency signal introduced by the mixer.

6. The adaptive frequency converter of claim 1, wherein the program instructions maintained on the memory causing the radio frequency planner to:

store the local oscillator drive level, the local oscillator frequency, the filter control signal, the target intermediate frequency, and the observation signal in memory; and perform reinforcement learning on the local oscillator drive level, the local oscillator frequency, the filter control signal, the target intermediate frequency, and the observation signal stored in memory to iteratively adapt the local oscillator drive level, the local oscillator frequency, the filter control signal, and the target intermediate frequency.

7. The adaptive frequency converter of claim 1, comprising a second directional coupler; wherein the second directional coupler is coupled between the mixer and the spur measurement circuit;

wherein the spur measurement circuit is configured to receive the intermediate frequency signal from the second directional coupler; wherein the spur measurement circuit is configured to generate the observation signal based on the radio frequency signal during up-convert and based on the intermediate frequency signal during down-convert;

wherein the mixer mixes the radio frequency signal with the local oscillator signal to generate the intermediate frequency signal during down-convert and mixes the intermediate frequency signal with the local oscillator signal to generate the radio frequency signal during up-convert.

8. The adaptive frequency converter of claim 7, comprising a switch; wherein the switch is coupled between the spur measurement circuit, the directional coupler, and the second directional coupler.

9. A radio system comprising:

an adaptive frequency converter, comprising:

a synthesizer; wherein the synthesizer is configured to generate a local oscillator signal based on a local oscillator drive level and a local oscillator frequency;

a mixer; wherein the mixer receives the local oscillator signal from the synthesizer; wherein the mixer mixes an intermediate frequency signal with the local oscillator signal to generate a radio frequency signal;

a tunable bandpass filter comprising a filter center frequency and a filter bandwidth; wherein the tunable bandpass filter is configured to tune the filter center frequency and the filter bandwidth based on a filter control signal; wherein the tunable bandpass filter receives the radio frequency signal from the mixer and filters the radio frequency signal at the filter center frequency and the filter bandwidth;

a directional coupler;

a spur measurement circuit; wherein the directional coupler is coupled between the tunable bandpass filter and the spur measurement circuit; wherein the spur measurement circuit is configured to receive the radio frequency signal from the directional coupler; wherein the spur measurement circuit is configured to generate an observation signal based on the radio frequency signal; wherein the observation signal comprises a plurality of powers for a plurality of channels; and a radio frequency planner comprising one or more processors and a memory; wherein the one or more processors are configured to execute program instructions maintained on the memory causing the radio frequency planner to:

receive at least a spur level, a local oscillator spur order, an intermediate frequency spur order, a target radio frequency, and a target bandwidth;

set at least the local oscillator drive level, the local oscillator frequency, the filter control signal, and a target intermediate frequency based on at least the spur level, the local oscillator spur order, the intermediate frequency spur order, the target radio frequency, and the target bandwidth; and iteratively adapt at least one of the local oscillator drive level, the local oscillator frequency, the filter control signal, or the target intermediate frequency based on the observation signal; and a software-defined radio coupled to the adaptive frequency converter; wherein the software-defined radio is configured to receive the target intermediate frequency from the radio frequency planner and generates the intermediate frequency signal at the target intermediate frequency;

wherein the spur measurement circuit comprises:

a filter bank; wherein the filter bank is coupled to the directional coupler; wherein the filter bank filters the radio frequency signal into the plurality of channels;

a radio frequency detector bank; wherein the radio frequency detector bank is coupled to the filter bank; wherein the radio frequency detector bank determines the plurality of powers for each of the plurality of channels; and an analog-to-digital converter bank; wherein the analog-to-digital converter bank is coupled to the radio frequency detector bank; wherein the analog-to-digital converter bank converts the plurality of powers to the observation signal.

10. The radio system of claim 9, wherein the radio frequency planner receives at least the spur level, the local oscillator spur order, the intermediate frequency spur order, the target radio frequency, and the target bandwidth from the software-defined radio.

11. The radio system of claim 9, comprising an antenna coupled to the adaptive frequency converter.

12. An adaptive frequency converter comprising:

a synthesizer; wherein the synthesizer is configured to generate a local oscillator signal based on a local oscillator drive level and a local oscillator frequency;

a tunable bandpass filter comprising a filter center frequency and a filter bandwidth; wherein the tunable bandpass filter is configured to tune the filter center frequency and the filter bandwidth based on a filter control signal; wherein the tunable bandpass filter filters a radio frequency signal at the filter center frequency and the filter bandwidth;

a mixer; wherein the mixer receives the local oscillator signal from the synthesizer and the radio frequency signal from the tunable bandpass filter; wherein the mixer mixes the radio frequency signal with the local oscillator signal to generate an intermediate frequency signal;

a directional coupler;

a spur measurement circuit; wherein the directional coupler is coupled between the mixer and the spur measurement circuit; wherein the spur measurement circuit is configured to receive the intermediate frequency signal from the directional coupler; wherein the spur measurement circuit is configured to generate an observation signal based on the intermediate frequency signal; wherein the observation signal comprises a plurality of powers for a plurality of channels; and a radio frequency planner comprising one or more processors and a memory; wherein the one or more processors are configured to execute program instructions maintained on the memory causing the radio frequency planner to:

receive at least a spur level, a local oscillator spur order, an intermediate frequency spur order, a target radio frequency, and a target bandwidth;

set at least the local oscillator drive level, the local oscillator frequency, the filter control signal, and a target intermediate frequency based on at least the spur level, the local oscillator spur order, the intermediate frequency spur order, the target radio frequency, and the target bandwidth; and iteratively adapt at least one of the local oscillator drive level, the local oscillator frequency, the filter control signal, or the target intermediate frequency based on the observation signal;

wherein the spur measurement circuit comprises:

a filter bank; wherein the filter bank is coupled to the directional coupler; wherein the filter bank filters the intermediate frequency signal into the plurality of channels;

a radio frequency detector bank; wherein the radio frequency detector bank is coupled to the filter bank; wherein the radio frequency detector bank determines the plurality of powers for each of the plurality of channels; and an analog-to-digital converter bank; wherein the analog-to-digital converter bank is coupled to the radio frequency detector bank; wherein the analog-to-digital converter bank converts the plurality of powers to the observation signal.

13. The adaptive frequency converter of claim 12, wherein the program instructions maintained on the memory causing the radio frequency planner to:

receive a spur table; and set at least the local oscillator drive level, the local oscillator frequency, the filter control signal, and the target intermediate frequency based on the spur table.

14. The adaptive frequency converter of claim 12, wherein the program instructions maintained on the memory causing the radio frequency planner to:

receive a spur model; and calculate, using the spur model, combinations of the intermediate frequency signal, the local oscillator signal, the local oscillator drive level, and the filter control signal that result in the target radio frequency, the target bandwidth, and the spur level out to the local oscillator spur order and the intermediate frequency spur order.

15. The adaptive frequency converter of claim 12, wherein the program instructions maintained on the memory causing the radio frequency planner to:

receive a filter transition bandwidth; and set at least the local oscillator drive level, the local oscillator frequency, the filter control signal, and the target intermediate frequency based on the filter transition bandwidth.

16. The adaptive frequency converter of claim 12, wherein iteratively adapting at least one of the local oscillator drive level, the local oscillator frequency, the filter control signal, or the target intermediate frequency reduces a spurious product in the intermediate frequency signal introduced by the mixer.

17. The adaptive frequency converter of claim 12, wherein the program instructions maintained on the memory causing the radio frequency planner to:

store the local oscillator drive level, the local oscillator frequency, the filter control signal, the target intermediate frequency, and the observation signal in memory; and perform reinforcement learning on the local oscillator drive level, the local oscillator frequency, the filter control signal, the target intermediate frequency, and the observation signal stored in memory to iteratively adapt the local oscillator drive level, the local oscillator frequency, the filter control signal, and the target intermediate frequency.

* * * * *